(12) United States Patent
Metcalfe et al.

(10) Patent No.: US 9,906,687 B2
(45) Date of Patent: Feb. 27, 2018

(54) METHOD AND APPARATUS FOR STARTING AN ERROR DIFFUSION METHOD

(71) Applicant: Xerox Corporation, Norwalk, CT (US)

(72) Inventors: David Jon Metcalfe, Marion, NY (US); Ryan David Metcalfe, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 51 days.

(21) Appl. No.: 15/065,442

(22) Filed: Mar. 9, 2016

(65) Prior Publication Data
US 2017/0264783 A1    Sep. 14, 2017

(51) Int. Cl.
*H04N 1/405* (2006.01)
*H04N 1/23* (2006.01)

(52) U.S. Cl.
CPC ........... *H04N 1/4052* (2013.01); *H04N 1/233* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,271,070 A | * | 12/1993 | Truong | H04N 1/4052 358/465 |
| 5,553,165 A | * | 9/1996 | Webb | H04N 1/4052 358/465 |
| 5,892,851 A | * | 4/1999 | Nguyen | H04N 1/4052 358/3.04 |
| 7,053,895 B2 | * | 5/2006 | Yamagata | G06T 1/20 345/419 |
| 7,420,700 B2 | * | 9/2008 | Hayashi | H04N 1/4052 358/1.15 |
| 7,474,442 B2 | * | 1/2009 | Dang | H04N 1/4052 358/3.03 |
| 8,234,326 B2 | * | 7/2012 | Tran | G06F 7/5318 708/620 |
| 9,262,704 B1 | * | 2/2016 | Metcalfe | H04N 1/40068 |

\* cited by examiner

*Primary Examiner* — Paul F Payer

(57) ABSTRACT

A method, non-transitory computer readable medium and apparatus for starting a multiple scanline error diffusion method are disclosed. For example, the method includes identifying a pixel for each scanline of a plurality of scanlines, wherein the pixel that is identified in the each scanline of the plurality of scanlines is offset, setting all pixels behind the pixel for the each scanline of the plurality of scanlines that is identified with a white pixel value and starting the multiple scanline error diffusion method.

18 Claims, 6 Drawing Sheets

METHOD AND APPARATUS FOR STARTING AN ERROR DIFFUSION METHOD

The present disclosure relates generally to improving a high speed software image path application and, more particularly, to a method and apparatus for starting a multiple scanline error diffusion method such as a vectorized-data parallel (VDP) error diffusion method.

BACKGROUND

Error diffusion is an image-processing algorithm used in many of today's multi-function devices (MFDs) to render 8 bits per pixel (bpp) or higher contone images into a print ready 1 bpp format. The wide acceptance of error diffusion algorithms is mainly due to the algorithm's inherent rendering properties, which provide favorable print image quality without generating artifacts (e.g., moiré artifacts, and the like). Moreover, error diffusion algorithms provide a good compromise when processing documents with "mixed" content, since the error diffusion algorithms faithfully preserve the image density of photographs, while at the same time rendering text, line-art, and graphics with acceptable print quality.

One drawback of error diffusion algorithms, however, is the computational cost of processing images for high-speed applications due to the sequential nature of the algorithm. The error diffusion node is usually the system-level bottleneck. Various multi-threaded and data parallel techniques have previously been developed in order to accelerate the overall processing speed of images processed via error diffusion. For example, images can be partitioned and sequentially processed via error diffusion one raster/scanline at a time using several concurrent threads in a time-multiplexed fashion. However, such error diffusion techniques require careful scheduling for the start of each raster relative to other rasters to eliminate inter-scanline boundary artifacts.

SUMMARY

According to aspects illustrated herein, there are provided a method, non-transitory computer readable medium and apparatus for starting a multiple scanline error diffusion method. One disclosed feature of the embodiments is a method that identifies a pixel for each scanline of a plurality of scanlines, wherein the pixel that is identified in the each scanline of the plurality of scanlines is offset, sets all pixels behind the pixel for the each scanline of the plurality of scanlines that is identified with a white pixel value and starts the multiple scanline error diffusion method.

Another disclosed feature of the embodiments is a non-transitory computer-readable medium having stored thereon a plurality of instructions, the plurality of instructions including instructions which, when executed by a processor, cause the processor to perform operations that identify a pixel for each scanline of a plurality of scanlines, wherein the pixel that is identified in the each scanline of the plurality of scanlines is offset, set all pixels behind the pixel for the each scanline of the plurality of scanlines that is identified with a white pixel value and start the multiple scanline error diffusion method.

Another disclosed feature of the embodiments is an apparatus comprising a processor and a computer-readable medium storing a plurality of instructions which, when executed by the processor, cause the processor to perform operations that identify a pixel for each scanline of a plurality of scanlines, wherein the pixel that is identified in the each scanline of the plurality of scanlines is offset, set all pixels behind the pixel for the each scanline of the plurality of scanlines that is identified with a white pixel value and start the multiple scanline error diffusion method.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for starting a multiple scanline error diffusion method. As discussed above, one drawback of error diffusion algorithms is the computational cost of processing images for high-speed applications due to the sequential nature of the algorithm.

One recently discovered method that improves the efficiency of error diffusion is a vectorized-data parallel (VDP) error diffusion method disclosed in recently allowed U.S. patent application Ser. No. 14/638,743, assigned to Xerox® corporation and incorporated by reference in its entirety. However, the VDP error diffusion method requires a "fill" and "flush" process. The "fill" initializes each register of a single instruction multiple data (SIMD) processor for each group of pixels in each scanline of a plurality of scanlines to begin the VDP error diffusion method for a swath of scanlines. The "flush" process empties each register of the SIMD processor at the end of the VDP error diffusion method for the swath of scanlines.

The "fill" and "flush" are repeated for each subsequent swath of scanlines until the VDP error diffusion method is complete for a particular image or video. However, the "fill" and "flush" process itself can be computationally taxing. For example, the "fill" and "flush" process can each include over 4,500 operations for a swath of 8 scanlines in the VDP error diffusion method.

Embodiments of the present disclosure provide a method to start the multiple scanline error diffusion method immediately without the performing the 4,500 operations associated with the "fill" process and the "flush" process. In other words, the error buffers can be initialized without performing the "fill" and "flush" process by using a padding operation, as described below. Consequently, the error buffers may be ready to apply the SIMD instructions for the multiple scanline error diffusion method immediately. As a result, some multiple scanline error diffusion methods (e.g., the VDP error diffusion method) for rendering an image or a video may be even more efficient.

Figure 1:
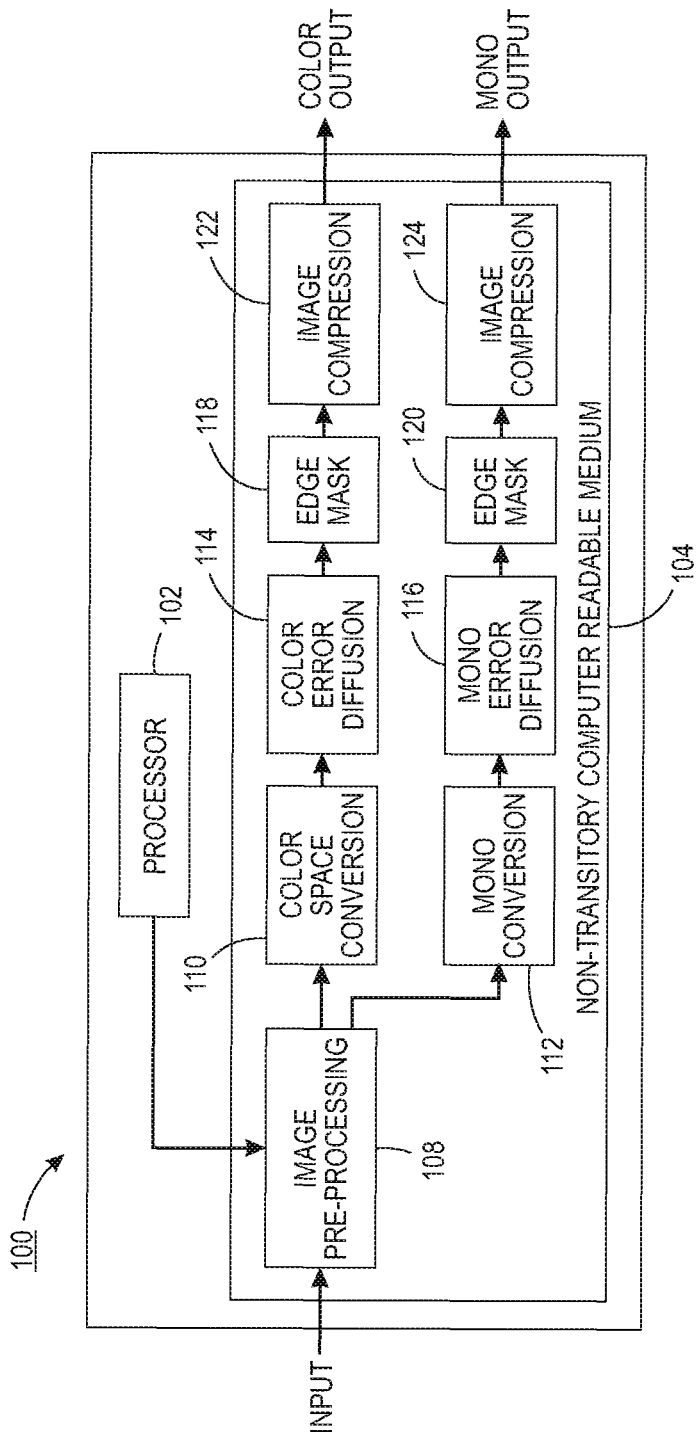
FIG. 1 illustrates an example block diagram of a multi-function device of the present disclosure.

FIG. 1 illustrates an example multi-function device (MFD) 100 of the present disclosure. In one embodiment, the MFD 100 may be any type of device that can perform multiple imaging functions, such as printing, faxing, copying, and the like.

It should be noted that FIG. 1 illustrates a simplified block diagram of the MFD 100. In other words, the MFD 100 may include additional hardware components, paper paths, functional modules, and the like. However, the MFD 100 has been simplified in FIG. 1 for ease of explanation.

In one embodiment, the MFD 100 may include a processor 102 and a non-transitory computer readable medium 104. The non-transitory computer readable medium 104 may include instructions for one or more modules or engines that are executed by the processor 102.

In one embodiment, the processor 102 may be a multi-threaded or multi-core processor that can execute multiple threads in parallel. The processor 102 may be able to execute SIMD instructions using multiple dedicated vector registers. For example, a single register of x bits may act as n registers having x/n bits (e.g., a 32 bit register may be divided into four 8-bit registers). As a result, a single load, a single multiply and a single save operation may process four pixels simultaneously when performing the multiple scanline error diffusion methods described herein.

In one example, an input may be provided to an image pre-processing module 108. The input may be a video or an image that is to be rendered by the MFD 100 for printing. In one example, the image pre-processing module 108 may perform functions such as color space conversion (e.g., red, green, blue (RGB) to Lab), perform filtering, image background suppression, pixel classification, image scaling, and the like.

The pre-processed input may then be directed towards an image path for color or monotone (e.g., black and white). In one example, the color image path may include a color space conversion engine 110, a color error diffusion engine 114, an edge mask engine 118 and an image compression engine 122. In one example, the color space conversion engine 110 may perform a color space conversion such as Lab to cyan, magenta, yellow and key (CMYK).

In one embodiment, the color error diffusion may apply the multiple scanline error diffusion method for each color separately. For example, the multiple scanline error diffusion method may be applied to the cyan color, then to the magenta color, then to the yellow color and then to the key. In one example, the multiple scanline error diffusion method may be the VDP error diffusion method disclosed in recently allowed U.S. patent application Ser. No. 14/638,743, assigned to Xerox® Corporation and incorporated by reference in its entirety.

In one embodiment, the edge mask engine 118 may determine dimensions for the edge mask and generate the edge mask. The edge mask may be located along the left and right edges of the print media (e.g., paper) that is used to print the image. The edge mask may provide an area that receives no ink to allow the paper to be handled within the MFD 100 without smearing ink.

In one embodiment, the image compression engine 122 may compress the image based on the rendered error diffusion output. In one example, any compression algorithm or function may be used. The compressed color image may then be output for printing, scanning, and the like, on the MFD 100.

In one embodiment, the monotone (also referred to as "mono") image path may include a mono conversion engine 112, a mono error diffusion engine 116, an edge mask engine 120 and an image compression engine 124. In one example, the mono conversion engine 112 may perform a monotone conversion. For example, it may take an 8 bit per pixel (bpp) image and convert it into a 1 bpp image. For example, each 8 bpp color value may be converted into a 0 or 1 to represent a white pixel or a black pixel, respectively.

In one embodiment, the mono error diffusion engine 116 may apply the multiple scanline error diffusion method. In one example, the multiple scanline error diffusion method may be the VDP error diffusion method disclosed in recently allowed U.S. patent application Ser. No. 14/638,743, assigned to Xerox® Corporation and incorporated by reference in its entirety.

In one embodiment, the edge mask engine 120 may determine dimensions for the edge mask and generate the edge mask similar to the edge mask engine 118. The edge mask may be located along the left and right edges of the print media (e.g. paper) that is used to print the image. The edge mask may provide an area that receives no ink to allow the paper to be handled within the MFD 100 without smearing ink.

In one embodiment, the image compression engine 124 may compress the image based on the error diffusion similar to the image compression engine 122. In one example, any compression algorithm or function may be used. The compressed mono image may then be output for printing, scanning, and the like, on the MFD 100.

Figure 2:
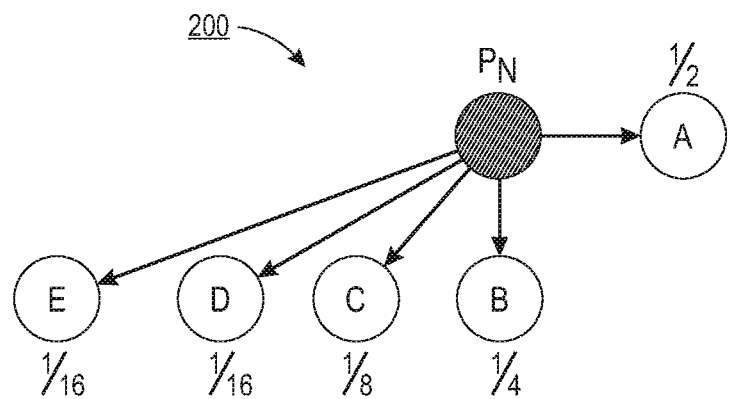
FIG. 2 illustrates a block diagram of an example distribution of error in an error diffusion method.

FIG. 2 illustrates one example of an error distribution 200 used for the multiple scanline error diffusion method. In one example, the multiple scanline error diffusion method may apply an anti-worm Shiau-Fan error filter coefficients. For example, for each pixel, PN, that is being analyzed half of the error may be diffused to the pixel A immediately to the right of pixel PN, one quarter of the error may be diffused to the pixel B immediately below pixel PN, one eighth of the error may be diffused to the pixel below and one pixel to the left of PN, one sixteenth of the error may be diffused to the pixel below and two pixels to the left of PN, and one sixteenth of the error may be diffused to the pixel below and three pixels to the left of PN as illustrated in FIG. 2.

As noted above, using the multi-threaded processors capable of SIMD instructions, the above error distribution 200 may be applied to an 8 scanline swath simultaneously. In one embodiment, the processor 102 may use 128 bit vector registers that are concatenated into 8 16-bit signed integer values. In addition, 10 vector registers may be used to carry out the multiple scanline error diffusion technique. However, it should be noted that the number of scanlines and the way the vector registers are divided may vary as processors are developed with vector registers that have more bits. As a result, the examples provided herein to describe the multiple scanline error diffusion method should not be considered as limiting.

As shown in FIG. 2, the error distribution 200 requires that each pixel that is being analyzed is at least four pixels ahead (e.g., pixel PN relative to pixel E). As a result, to perform the error distribution 200 on an 8 scanline swath, each pixel of a scanline should be at least 4 pixels in front of the pixel being analyzed in the scanline below.

Figure 3:
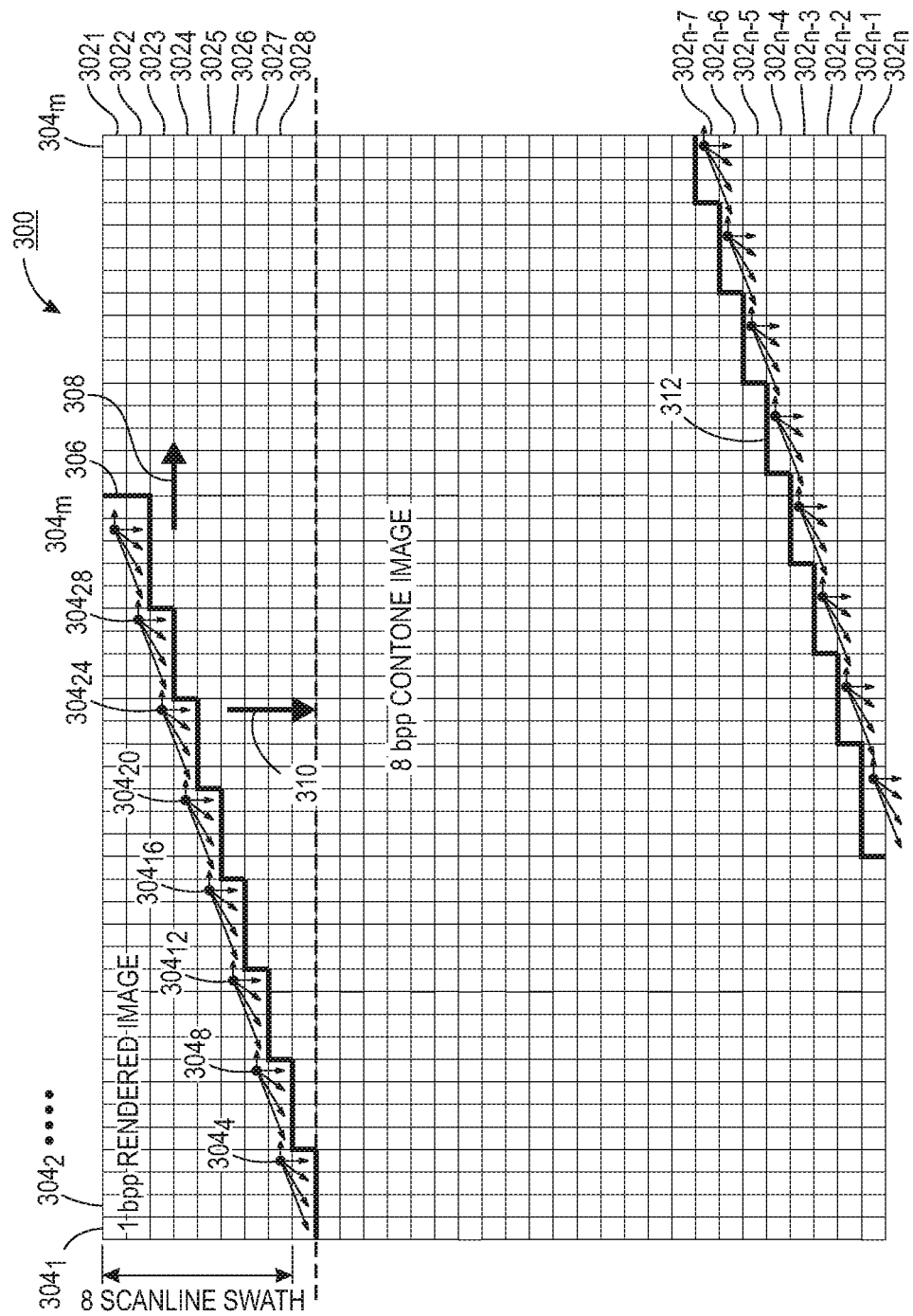
FIG. 3 illustrates a block diagram of an example multiple scanline error diffusion method and how to start the multiple scanline error diffusion method.

FIG. 3 illustrates an example trapezoidal wave-front 310 formed by the arrangement of each pixel being analyzed for the 8 scanline swath using the error distribution 200. In one embodiment, the trapezoidal wave-front 310 may begin at a top-left corner of an image 300.

In one embodiment, the image 300 may comprise a plurality of scanlines $302_1$ to $302_n$ (also referred to herein collectively as scanlines 302 or individually as a scanline 302). Each scanline 302 may include a plurality of pixels $304_1$ to $304_m$ (also referred to herein collectively as pixels 304 or individually as a pixel 304). Each scanline 302 of the 8 scanline swath may identify a pixel 304 that is to be processed in parallel by the error distribution 200. For example, FIG. 3 the trapezoidal wave-front 310 may be defined by the outline of the error distribution 200 performed on pixel $304_{32}$ in scanline $302_1$, pixel $304_{28}$ in scanline $302_2$, pixel $304_{24}$ in scanline $302_3$, pixel $304_{20}$ in scanline $302_4$, pixel $304_{16}$ in scanline $302_5$, pixel $304_{12}$ in scanline $302_6$, pixel $304_8$ in scanline $302_7$, and pixel $304_4$ in scanline $302_8$.

Notably, the trapezoidal wave-front 310 is formed by an offset formation of each identified pixel 304 in each scanline 302. Said another way, the trapezoidal wave-front 310 comprises the pixel $304_{32}$ in a first scanline $302_1$ being located 32 pixels in on the first scanline $302_1$ and each subsequent pixel (e.g., $304_{28}$, $304_{24}$, $304_{20}$, $304_{16}$, $304_{12}$, $304_8$, and $304_4$) below the first scanline $302_1$ that is identified is offset by four pixels in a non-overlapping fashion behind a previous pixel in an above scanline (e.g., the pixel $304_{28}$ in the scanline $302_2$ is four pixels offset from the pixel $304_{32}$ in the scanline $302_1$ that is above the scanline $302_2$, the pixel $304_{24}$ in the scanline $302_3$ is four pixels offset from the pixel $304_{28}$ in the scanline $302_2$ that is above the scanline $302_3$, and so forth).

All pixels 304 behind the trapezoidal wave-front 310 (e.g., pixels 304 that are above and to the left) may represent a portion of the image 300 that has been rendered into a 1 bpp monotone image. All the pixels 304 in front of the trapezoidal wave-front 310 (e.g., pixels 304 that are below and to the right) may represent a portion of the image 300 that has not yet been rendered and remain in an 8 bpp contone image format. The multiple scanline error diffusion process may continue using the trapezoidal wave-front 310 until the entire image 300 is processed as shown by a trapezoidal wave-front 310 that includes the last 8 line scanline swath of scanlines $302_n$ to $302_{n-7}$.

In one embodiment, to perform the multiple scanline error diffusion method using the error distribution 200, a "fill" and a "flush" operation is performed to prepare error buffers to apply the SIMD vector registers. The "fill" operation may begin with the pixel $304_1$ of scanline $302_1$ to perform the error distribution 200 with pixels that are off the image 300 and repeats for four pixels up to the $304_4$ in the scanline $302_1$ to the right as shown by arrow 308. Then, the process continues down one scanline to scanline $302_2$ as shown by arrow 310 with the pixel $304_1$ of the scanline $302_2$. The "fill" operation continues by applying the error distribution 200 for pixels $304_5$ to $304_8$ of scanline $302_1$ and pixels $304_1$ to $304_4$ of scanline $302_2$. The process is repeated to complete the "fill" operation until the trapezoidal wave-front 310 is formed and the error buffers are filled and ready to perform the multiple scanline error diffusion method. The "flush" operation is performed similarly once the last pixel in the top scanline (e.g., pixel $304_m$ in scanline $302_1$) reaches the right edge of the image 300.

However, as discussed above, the traditional method for performing the "fill" and "flush" operations can have a high computational cost. For example, the "fill" and "flush" operations can each require performing over 4,500 operations for a total of over 9,000 operations for each 8 scanline swatch that is processed via the multiple scanline error diffusion method.

One embodiment of the present disclosure eliminates the need to perform the "fill" and "flush" operations using a padding function such that the multiple scanline error diffusion method may begin immediately. In one embodiment, a pixel 304 may be identified in each scanline 302 in the 8 scanline swath. For example, the pixels 304 may be identified to form the trapezoidal wave-front 310 (e.g., pixel $304_{32}$ in scanline $302_1$, pixel $304_{28}$ in scanline $302_2$, pixel $304_{24}$ in scanline $302_3$, pixel $304_{20}$ in scanline $302_4$, pixel $304_{16}$ in scanline $302_5$, pixel $304_{12}$ in scanline $302_6$, pixel $304_8$ in scanline $302_7$, and pixel $304_4$ in scanline $302_8$). Then all the pixels 304 above and to the left of the trapezoidal wave-front 310 may be set to have a white pixel value (e.g., zero) to "fill" the error buffers. In other words, the error buffers may be "padded" such that all of the error buffers are set to 0 initially to allow the multiple scanline error diffusion method to begin within the image 300.

Similarly, when the trapezoidal wave-front 310 reaches the end of the 8 scanline swath, all pixels 304 below and to the right within the 8 scanline swath may be set to have the white pixel value (e.g., zero). For example, if the last scanline was scanline $302_8$, all pixels below and to the right of pixels $304_m$ in scanline $302_1$, pixel $304_{m-4}$ in scanline $302_2$, pixel $304_{m-8}$ in scanline $302_3$, pixel $304_{m-12}$ in scanline $302_4$, pixel $304_{m-16}$ in scanline $302_5$, pixel $304_{m-20}$ in scanline $302_5$, pixel $304_{m-24}$ in scanline $302_6$, pixel $304_{m-28}$ in scanline $302_7$, and pixel $304_{m-32}$ in scanline $302_8$ would be set to have the white pixel value to "flush" the error buffers. Thus, the need to perform the "fill" and "flush" operations may be eliminated.

Figure 4:
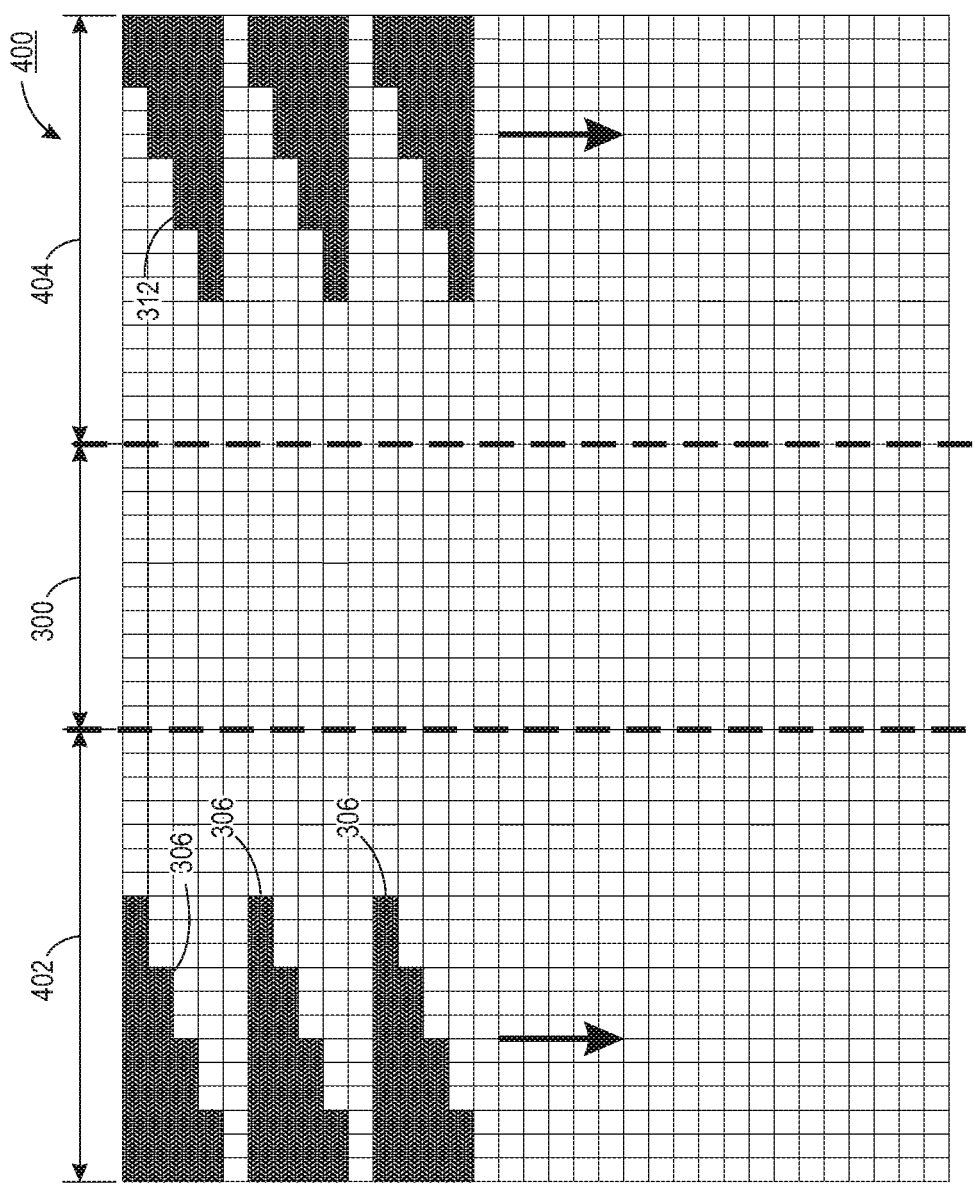
FIG. 4 illustrates a block diagram of another example of how to start the multiple scanline error diffusion method.

FIG. 4 illustrates another embodiment of the present disclosure. FIG. 4 illustrates an image 400 that includes a left mask 402, the image 300 in FIG. 3 and a right mask 404. FIG. 4 also illustrates the beginning trapezoidal wave-front 306 and an ending trapezoidal wave-front 312 for each 8 scanline swath that is processed for the image 400. It should be noted for ease of explanation that the trapezoidal wave-fronts 306 and 312 are not drawn to scale.

In some embodiments, the left mask 402 and the right mask 404 may have a width of approximately 71 pixels for a 600×600 dots per inch (dpi) output resolution. As a result, the width of the left mask 402 and the right mask 404 may be wider than the width of pixels 304 used in the trapezoidal wave-front 306 used for the multiple scanline error diffusion method. As a result, all of the pixels 304 in the left mask 402 and the right mask 404 may be set to have a white pixel value (e.g., zero). Most image paths do not print around the periphery of the image 400 to eliminate printing of toner and/or ink around these regions of the document due to mechanical attributes of paper handling, toner, and/or printhead designs. As a result, by setting all pixels 304 in the left mask 402 and the right mask 404 to zero will be unlikely to introduce any artifacts in the printed portion of the image 300 when the multiple scanline error diffusion method is performed.

Figure 5:
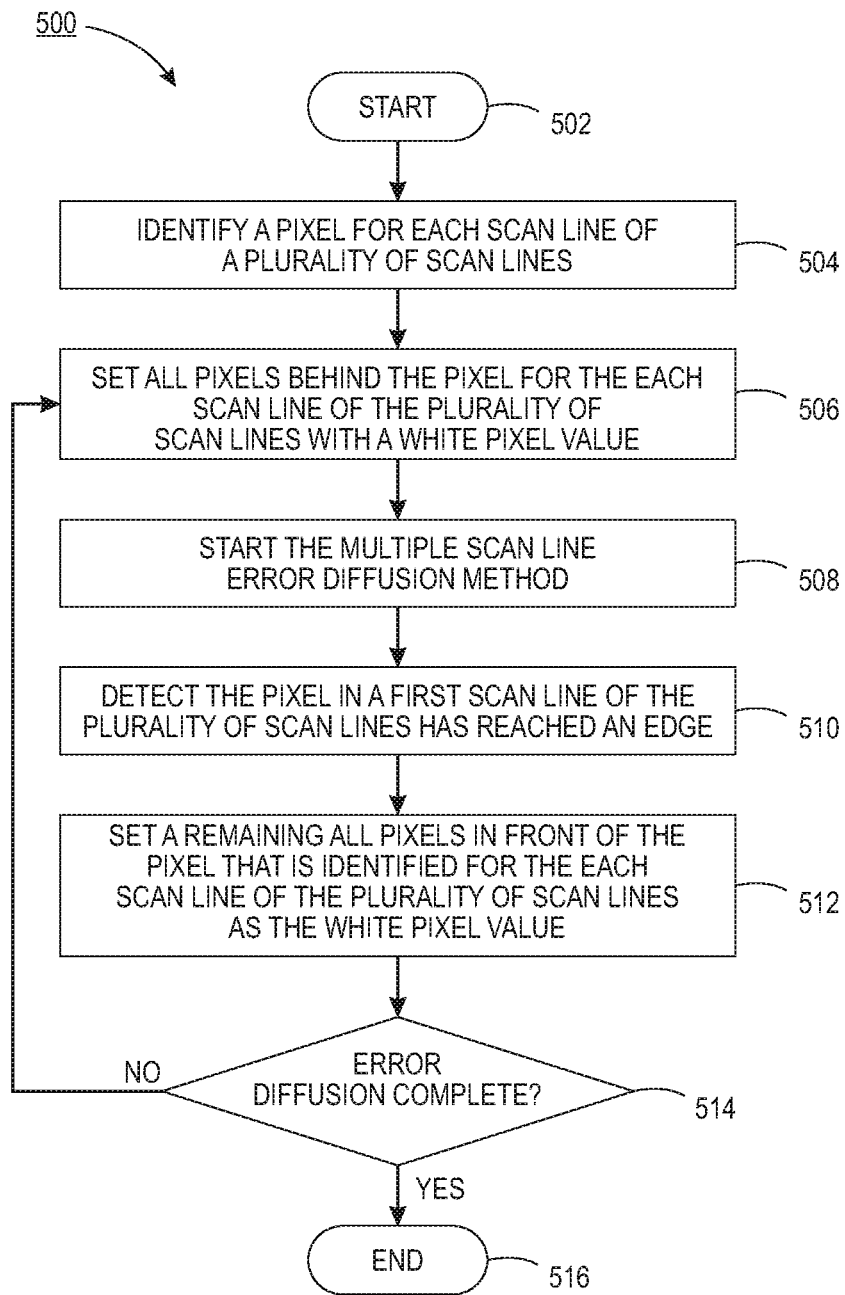
FIG. 5 illustrates a flowchart of an example method for starting a multiple scanline error diffusion method.
Figure 6:
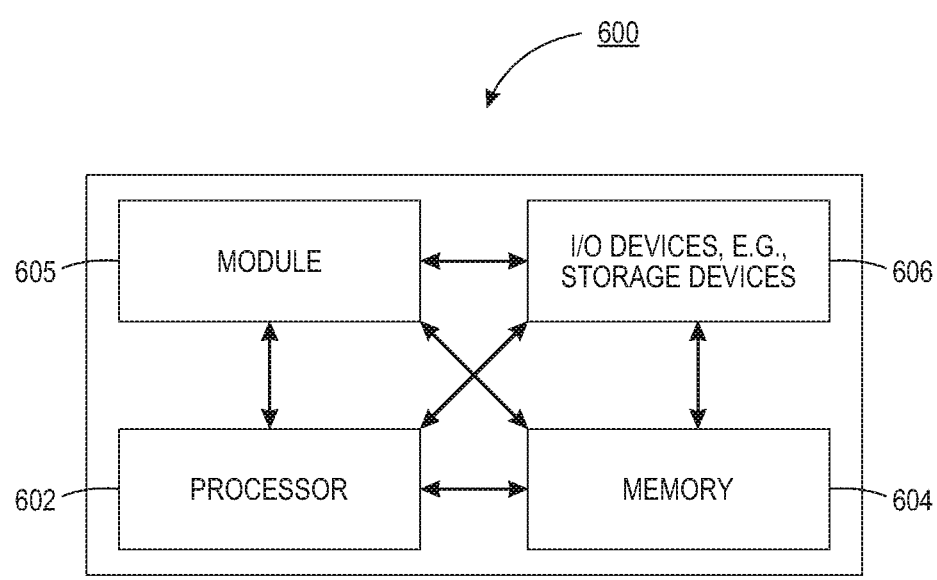
FIG. 6 illustrates a high-level block diagram of a computer suitable for use in performing the functions described herein.

FIG. 5 illustrates a more detailed flowchart of an example method 500 for starting a multiple scanline error diffusion method. In one embodiment, one or more steps or operations of the method 500 may be performed by the MFD 100 and/or a computer as illustrated in FIG. 6 and discussed below.

At block 502, the method 500 begins. At block 504, the method 500 identifies a pixel for each scanline of a plurality of scanlines. In one embodiment, the pixel identified in each scanline of the plurality of scanlines may be offset. In one example, the pixels identified in each scanline of an 8 scanline swatch may be offset to form a trapezoidal wave-front.

In one embodiment, the trapezoidal wave-front may be formed by the pixel in a first scanline being located 32 pixels in on the first scanline and each subsequent pixel below the first scanline that is identified is offset by four pixels in a non-overlapping fashion behind a previous pixel in an above scanline. In other words, the pixel identified in the second scanline would be located 28 pixels in on the second scanline, the pixel identified in the third scanline would be located 24 pixels in on the third scanline, and so forth, down to the pixel identified in the eighth scanline that would be located 4 pixels in on the eighth scanline. The trapezoidal wave-front may be to allow for each scanline to be processed using the anti-worm Shiau-Fan error filter coefficients described above and illustrated in FIG. 2.

In one embodiment, depending on whether an edge mask is used, the trapezoidal wave-front may begin on a left edge of the left edge mask or the left edge of an image that is being processed.

At block 506, the method 500 sets all pixels behind the pixel for the each scanline of the plurality of scanlines that is identified with a white pixel value. In other words, to avoid the "fill" operations, all pixels behind (e.g., above and to the left) of the trapezoidal wave-front may be set to zero. As a result, all the error buffers may be initialized with a value of zero to allow the multiple scanline error diffusion method to begin immediately without the "fill" operation being performed.

At block 508, the method 500 starts the multiple scanline error diffusion method. In one embodiment, the multiple scanline error diffusion method may be the VDP error diffusion method for high speed software image path applications disclosed in recently allowed U.S. patent application Ser. No. 14/638,743, assigned to Xerox® Corporation and incorporated by reference in its entirety.

At block 510, the method 500 detects the pixel in a first scanline of the plurality of scanlines has reached an edge. For example, when the pixel that is identified in the first scanline has reached the right edge of the image, the trapezoidal wave-front may be at an end of the 8 scanline swath.

At block 512, the method 500 sets a remaining all pixels in front of the pixel that is identified for the each scanline of the plurality of scanlines as the white pixel value. In other words, to avoid performing a "flush" operation, all pixels in front (e.g., to the right and below) of the trapezoidal wave-front may be set to zero. As a result, all the error buffers may be emptied to have a value of zero to allow the multiple scanline error diffusion immediately move to the next 8 scanline swath for processing.

At block 514, the method 500 determines if the multiple scanline error diffusion method is complete. If the error diffusion is not complete, the method 500 may return to block 504 and the method 500 may be repeated. For example, the method 500 may begin performing the multiple scanline error diffusion method on the next plurality of scanlines in the image or video.

However, if the error diffusion is complete, the method 500 may proceed to block 516. At block 516, the method 500 ends.

It should be noted that although not explicitly specified, one or more steps, functions, or operations of the method 500 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 5 that recite a determining operation, or involve a decision, do not necessarily require that both branches of the determining operation be practiced. In other words, one of the branches of the determining operation can be deemed as an optional step.

FIG. 6 depicts a high-level block diagram of a computer that can perform the functions described herein. As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for starting a multiple scanline error diffusion method, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for starting a multiple scanline error diffusion method (e.g., a software program comprising computer-executable instructions) can be loaded into memory 604 and executed by hardware processor element 602 to implement the steps, functions or operations as discussed above in connection with the example method 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for starting a multiple scanline error diffusion method (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for starting a multiple scanline error diffusion method, the method comprising:
   identifying, by a processor, a pixel for each scanline of a plurality of scanlines, wherein the pixel that is identified in each scanline of the plurality of scanlines is offset to form a trapezoidal wave-front;
   setting, by the processor, all pixels behind the pixel for each scanline of the plurality of scanlines that is identified with a white pixel value; and
   starting, by the processor, the multiple scanline error diffusion method.

2. The method of claim 1, wherein the multiple scanline error diffusion method comprises a vectorized data parallel error diffusion method for high speed software image path applications.

3. The method of claim 1, wherein the plurality of scanlines comprises eight scanlines.

4. The method of claim 1, wherein the trapezoidal wave-front comprises the pixel in a first scanline being located 32 pixels in on the first scanline and each subsequent pixel below the first scanline that is identified is offset by four pixels in a non-overlapping fashion behind a previous pixel in an above scanline.

5. The method of claim 1, wherein the trapezoidal wave-front begins on a left edge of an image.

6. The method of claim 1, wherein the trapezoidal wave-front begins on a left edge of a mask of an image.

7. The method of claim 1, further comprising:
   detecting, by the processor, the pixel in a first scanline of the plurality of scanlines has reached an edge; and
   setting, by the processor, all remaining pixels in front of the pixel that is identified for each scanline of the plurality of scanlines as the white pixel value.

8. A non-transitory computer-readable medium storing a plurality of instructions, which when executed by a processor, cause the processor to perform operations for starting a multiple scanline error diffusion method, the method comprising:
   identifying a pixel for each scanline of a plurality of scanlines, wherein the pixel that is identified in each scanline of the plurality of scanlines is offset to form a trapezoidal wave-front;
   setting all pixels behind the pixel for each scanline of the plurality of scanlines that is identified with a white pixel value; and
   starting the multiple scanline error diffusion method.

9. The non-transitory computer-readable medium of claim 8, wherein the multiple scanline error diffusion method comprises a vectorized data parallel error diffusion method for high speed software image path applications.

10. The non-transitory computer-readable medium of claim 8, wherein the plurality of scanlines comprises eight scanlines.

11. The non-transitory computer-readable medium of claim 8, wherein the trapezoidal wave-front comprises the pixel in a first scanline being located 32 pixels in on the first scanline and each subsequent pixel below the first scanline that is identified is offset by four pixels in a non-overlapping fashion behind a previous pixel in an above scanline.

12. The non-transitory computer-readable medium of claim 8, wherein the trapezoidal wave-front begins on a left edge of an image.

13. The non-transitory computer-readable medium of claim 8, wherein the trapezoidal wave-front begins on a left edge of a mask of an image.

14. The non-transitory computer-readable medium of claim 8, further comprising:
   detecting the pixel in a first scanline of the plurality of scanlines has reached an edge; and
   setting all remaining pixels in front of the pixel that is identified for each scanline of the plurality of scanlines as the white pixel value.

15. A method for starting a multiple scanline error diffusion method, the method comprising:
   generating, by a processor, a trapezoidal wave-front comprising a plurality of scanlines, wherein a pixel is identified for each scanline of the plurality of scanlines, wherein the pixel identified in a last scanline of the plurality of scanlines is located at a bottom left edge of an image and each subsequent pixel that is identified above the last scanline is located offset by a non-overlapping fashion in front of a previous pixel that is identified in a previous scanline;
   setting, by the processor, all pixels located above and left of the trapezoidal wave-front with a white pixel value; and
   starting, by the processor, the multiple scanline error diffusion method.

16. The method of claim 15, wherein the plurality of scanlines comprises an eight scanline swath.

17. The method of claim 16, wherein the bottom left edge of the image is within a mask region.

18. The method of claim 15, further comprising:
   detecting, by the processor, the pixel in a first scanline of the plurality of scanlines has reached an edge; and
   setting, by the processor, all remaining pixels in front of the pixel that is identified for each scanline of the plurality of scanlines as the white pixel value.

* * * * *